(12) United States Patent
Liu

(10) Patent No.: US 9,420,408 B2
(45) Date of Patent: Aug. 16, 2016

(54) TIRE STATUS MONITORING-TRANSMISSION SYSTEM AND TRANSMISSION DEVICE THEREOF

(71) Applicant: Silergy Semiconductor Technology (Hangzhou) LTD, Hangzhou (CN)

(72) Inventor: Chi-Kang Liu, Hsinchu (TW)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 25 days.

(21) Appl. No.: 14/617,047

(22) Filed: Feb. 9, 2015

(65) Prior Publication Data

US 2015/0367691 A1 Dec. 24, 2015

(30) Foreign Application Priority Data

Jun. 20, 2014 (TW) .............................. 103121386 A
Dec. 23, 2014 (TW) .............................. 103144967 A

(51) Int. Cl.
*B60C 23/00* (2006.01)
*H04W 4/00* (2009.01)
*B60C 23/04* (2006.01)

(52) U.S. Cl.
CPC ........... *H04W 4/008* (2013.01); *B60C 23/0479* (2013.01)

(58) Field of Classification Search
CPC ........................... H04W 4/008; B60C 23/0408
USPC ..................................... 340/442–448; 73/146
See application file for complete search history.

(56) References Cited

U.S. PATENT DOCUMENTS

| 2009/0102636 | A1* | 4/2009 | Tranchina | B60C 23/0408 340/447 |
| 2010/0207753 | A1* | 8/2010 | Sugiura | B60C 23/0433 340/447 |
| 2011/0205047 | A1* | 8/2011 | Patel | B60C 23/0401 340/447 |

* cited by examiner

*Primary Examiner* — Phung Nguyen

(57) ABSTRACT

A tire status monitoring-transmission system and a transmission device thereof are disclosed. The system comprises a Bluetooth wireless transceiving host computer having a display interface and sending out a response signal after detecting an upward Bluetooth broadcasting signal; a plurality of transmission modules each including a Bluetooth wireless transceiving unit persistently emitting the upward Bluetooth broadcasting signal and receiving the response signal; a control unit electrically connected with the Bluetooth wireless transceiving unit and generating a trigger signal according to the response signal; and a sensor module electrically connected with the control unit, triggered by the trigger signal to detect a tire status, and generating detection signals to the control unit, wherein the control unit further transmits the detection signals to the Bluetooth wireless transceiving host computer through the Bluetooth wireless transceiving unit, and the Bluetooth wireless transceiving host computer presents the tire status on the display interface.

15 Claims, 5 Drawing Sheets

TIRE STATUS MONITORING-TRANSMISSION SYSTEM AND TRANSMISSION DEVICE THEREOF

This application claims priorities for Taiwan patent application Nos. 103121386 filed on Jun. 20, 2014 and 103144967 filed on Dec. 23, 2014, the content of which are incorporated by reference in their entirely.

BACKGROUND OF THE INVENTION

1. Field of the Invention

The present invention relates to a monitoring system, particularly to a tire status monitoring-transmission system and a transmission device thereof.

2. Description of the Related Art

As indicated by the terminology itself, the tire pressure monitoring system (TPMS) is a system to detect tire pressure. TPMS can automatically monitor the tire status and alert the user about underpressure, overpressure, fast air leakage, overtemperature of the tires.

An underpressure tire is likely to deform, increase contact area and friction with the road, experience more abrasion, and have shorter service life and higher risk of tire bursts. According to the experimental results, 3PSI tire pressure reduction will increase over 1% gasoline consumption. An overpressure tire is likely to decrease traction ability and cause vehicle skid. Therefore, tire pressure is a critical factor for driving safety.

In addition to tire pressure, tire temperature is also an important factor for driving safety. The higher the tire temperature, the lower the tire strength, and the greater the tire deformation. Increased tire temperature will accelerate tire abrasion and decrease the service life of the tire. Therefore, appropriate tire pressure and tire temperature not only maintains driving safety but also decreases gasoline consumption and increases the service life of the tire.

As shown in FIG. 1, a conventional TPMS comprises a tire pressure monitoring device 70 installed in a wheel of a vehicle. The tire pressure monitoring device 70 includes a tire pressure monitoring unit 72. The tire pressure monitoring unit 72 further includes an angular velocity sensor 724 or a gravity sensor to detect whether the wheel is rotating. In FIG. 1, the angular velocity sensor 724 is used to exemplify the sensor for detecting wheel rotation. Once detecting that the wheel is rotating, the angular velocity sensor 724 triggers the tire pressure monitoring unit 72 to detect tire pressure and transmit the tire pressure signal to a control unit 74. The control unit 74 transmits the tire pressure signal through a wireless transmission unit 76 to an external wireless receiving device 80 matched with the wireless transmission unit 76. The tire pressure monitoring unit 72, the control unit 74 and the wireless transmission unit 76 are all powered by an energy storage unit 78. The signals can only be transmitted from the wireless transmission unit 76 to the wireless receiving device 80 unidirectionally. In the conventional technology, the wireless receiving device 80 cannot inform the wireless transmission unit 76 that the tire pressure signal has been received. Therefore, the tire pressure monitoring device 70 cannot confirm whether the tire pressure signal is received. The conventional TPMS normally transmits tire pressure signals in a Bluetooth technology. In the ordinary Bluetooth technology, the wireless transmission unit 76 and the wireless receiving device 80 must be matched before signal transmission. However, the matching process would consume a lot of time. Besides, the blind angle occurring in wheel rotation often impairs matching. Then, the system will take longer time and consume more power to complete the matching. Thus, the service life of the battery is shortened. Further, the link between the wireless transmission unit 76 and the wireless receiving device 80 will be interrupted once communication between the wireless transmission unit 76 and the wireless receiving device 80 has disappeared over 30 seconds. Thus, the wireless transmission unit 76 and the wireless receiving device 80 need re-matching for communication. The frequent matching activities further increase the power consumption.

Besides, the wireless transmission unit 76 of the tire pressure monitoring device 70 cannot directly transmit signals to a wireless communication device. If the tire pressure signal is intended to be transmitted to a wireless communication device, the wireless receiving device 80 must further have the configuration shown in FIG. 2. In FIG. 2, the wireless receiving device 80 includes a wireless receiving unit 82, a control unit 84 and a wireless transmission unit 86. After the wireless receiving unit 82 receives the tire pressure signal, the control unit 84 controls the wireless transmission unit 86 to transmit the tire pressure signal to a portable wireless communication device 90.

The abovementioned conventional technology uses the angular velocity sensor 724 to detect whether the wheel is rotating. However, the angular velocity sensor is more likely to break down. Moreover, the angular velocity sensor cannot detect vehicle movement unless the velocity of the vehicle exceeds 30 Km/hr. therefore, the angular velocity sensor also consume much power.

Accordingly, the present invention proposes a tire status monitoring-transmission system and a transmission device thereof to overcome the conventional problems.

SUMMARY OF THE INVENTION

The primary objective of the present invention is to provide a tire status monitoring-transmission system and a transmission device thereof, which uses a Bluetooth technology to enable an external transceiving host computer to receive signals, whereby to promote the stability and convenience of data transmission, and which uses Bluetooth signals to replace the angular velocity sensor or gravity sensor of the conventional technology in detecting whether a vehicle is started, whereby to increase the accuracy of detecting whether a vehicle is started.

Another objective of the present invention is to provide a tire status monitoring-transmission system and a transmission device thereof, which uses a Bluetooth broadcasting method to transmit information, whereby the power consumption is decreased and the cost is reduced.

To achieve the abovementioned objectives, the present invention proposes a tire status monitoring-transmission system, which comprises a Bluetooth wireless transceiving host computer having a display interface and sending out a response signal if having detected an upward Bluetooth broadcasting signal; a plurality of transmission modules wirelessly linking to the Bluetooth wireless transceiving host computer and each including a Bluetooth wireless transceiving unit persistently emitting the upward Bluetooth broadcasting signal and receiving the response signal after the Bluetooth wireless transceiving host computer is started, receives the upward Bluetooth broadcasting signal and generates the response signal; and a control unit electrically connected with the Bluetooth wireless transceiving unit and generating a trigger signal according to the response signal; and a sensor module electrically connected with the control unit, triggered by the trigger signal to detect a tire status, and generating detection signals to the control unit, wherein the control unit further transmits the detection signals to the Bluetooth wireless transceiving host computer through the Bluetooth wireless transceiving unit, and wherein the Bluetooth wireless transceiving host computer presents the tire status on the display interface.

The present invention also proposes a transmission device for a tire status monitoring-transmission system, which comprises a Bluetooth wireless transceiving host computer sending out a response signal if having detected an upward Bluetooth broadcasting signal, and which further comprises a Bluetooth wireless transceiving unit persistently emitting the upward Bluetooth broadcasting signal and receiving the response signal after the Bluetooth wireless transceiving host computer receives the upward Bluetooth broadcasting signal and generates the response signal; and a control unit electrically connected with the Bluetooth wireless transceiving unit and sending out a trigger signal according to the response signal.

Below, embodiments are described in detail to make easily understood the objectives, technical contents, characteristics and accomplishments of the present invention.

DETAILED DESCRIPTION OF THE INVENTION

Figure 1:
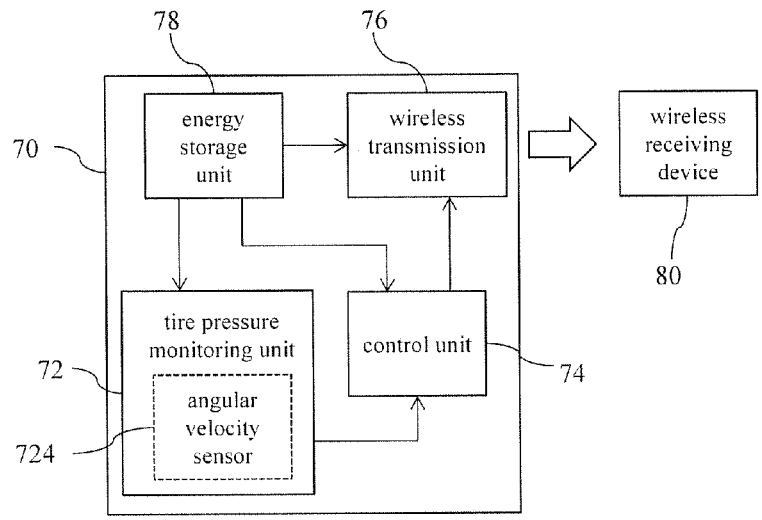
FIG. 1 is a block diagram schematically showing a conventional TPMS.
Figure 2:
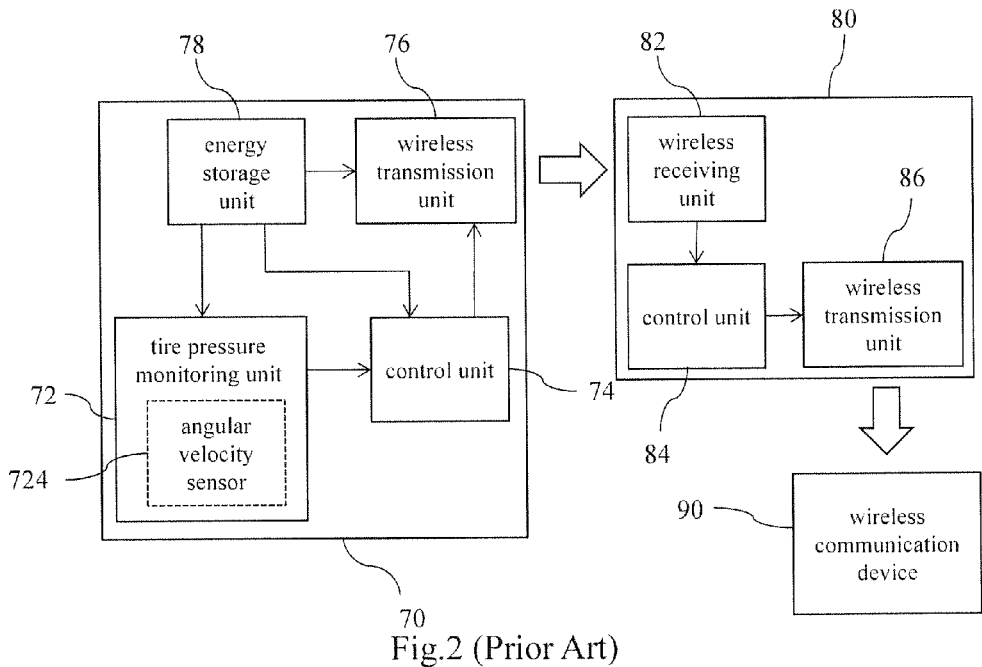
FIG. 2 is a block diagram schematically showing anther conventional TPMS.
Figure 3:
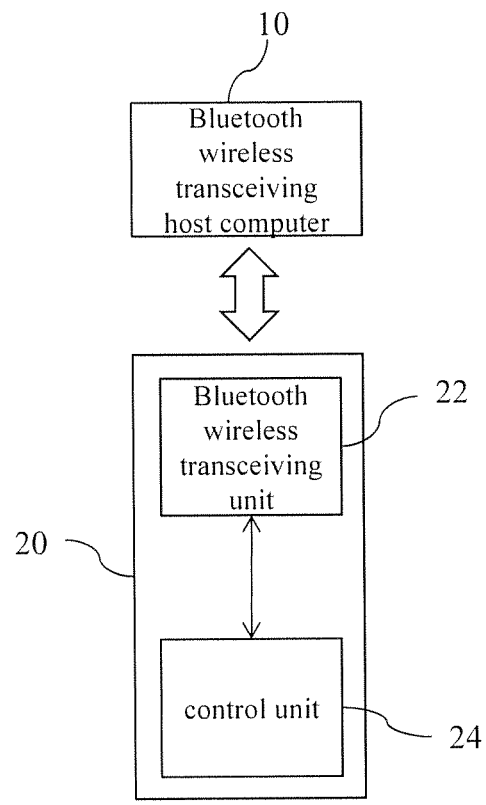
FIG. 3 is a block diagram schematically showing a transmission device according to one embodiment of the present invention.

Refer to FIG. 3 a block diagram schematically showing a transmission device for a tire status monitoring-transmission system according to one embodiment of the present invention. The transmission device of the present invention comprises a Bluetooth wireless transceiving host computer 10, a Bluetooth wireless transceiving unit 22, and a control unit 24. While the Bluetooth wireless transceiving host computer 10 scans and detects an upward Bluetooth broadcasting signal, the Bluetooth wireless transceiving host computer 10 transmits a response signal to the Bluetooth wireless transceiving unit 22 of a transmission module 20. The Bluetooth wireless transceiving unit 22 persistently emits the upward Bluetooth broadcasting signal. The Bluetooth wireless transceiving host computer 10 scans whether there is the upward Bluetooth broadcasting signal. If the Bluetooth wireless transceiving host computer 10 detects the upward Bluetooth broadcasting signal, the Bluetooth wireless transceiving host computer 10 transmits a response signal to the Bluetooth wireless transceiving unit 22 corresponding to the upward Bluetooth broadcasting signal. The Bluetooth wireless transceiving unit 22 further transmits the response signal to the control unit 24 electrically connected with the Bluetooth wireless transceiving unit 22. The control unit 24 generates a trigger signal according to the response signal and sends out the trigger signal.

Figure 4:
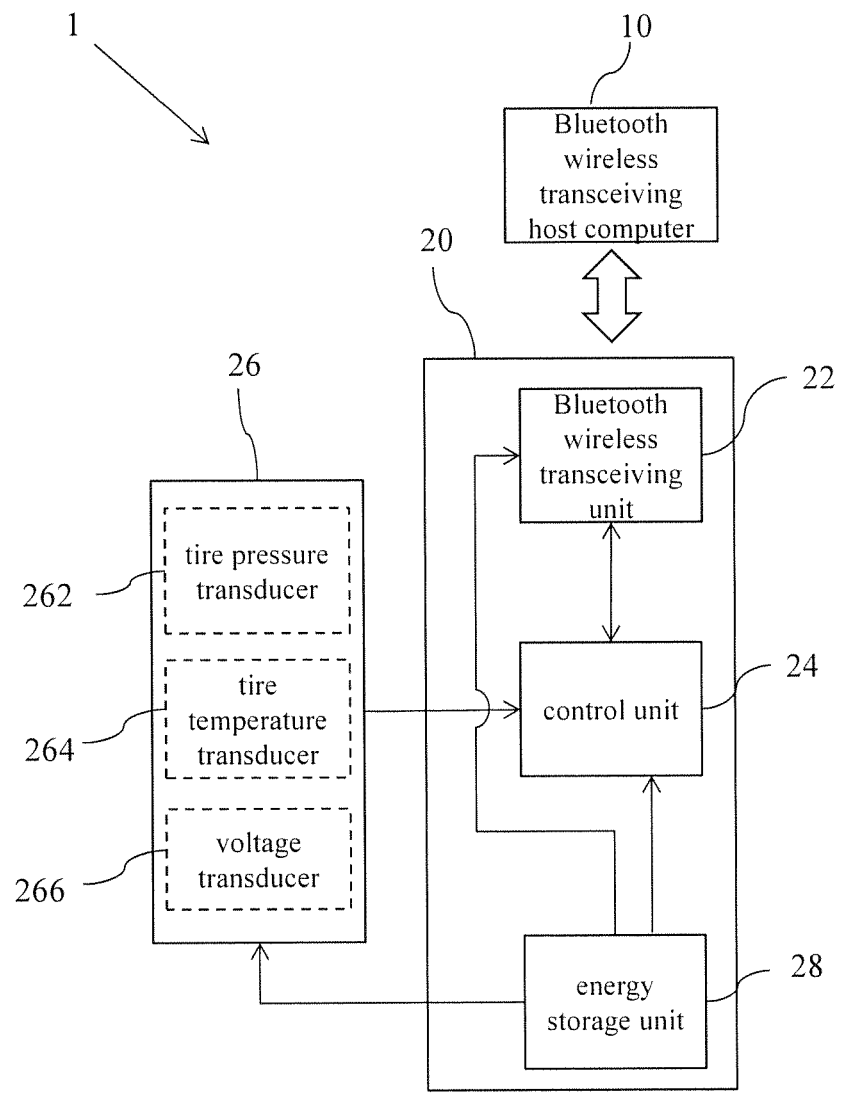
FIG. 4 is a block diagram schematically showing a tire status monitoring-transmission system according to one embodiment of the present invention.

Refer to FIG. 4 a block diagram schematically showing a tire status monitoring-transmission system according to one embodiment of the present invention. In the embodiment shown in FIG. 4, the transmission device is applied to a tire status monitoring-transmission system 1. The tire status monitoring-transmission system 1 comprises a Bluetooth wireless transceiving host computer 10, a plurality of transmission modules 20 and a sensor module 26. The Bluetooth wireless transceiving host computer 10 may be a smart phone or a host computer installed in the vehicle. The Bluetooth wireless transceiving host computer 10 has a display interface (not shown in the drawings). The display interface may be lights or a liquid crystal display device. After started, the Bluetooth wireless transceiving host computer 10 scans at given frequency bands. While detecting an upward Bluetooth broadcasting signal, the Bluetooth wireless transceiving host computer 10 generates a response signal corresponding to the upward Bluetooth broadcasting signal, and the response signal includes an identity label. The Bluetooth wireless transceiving host computer 10 further transmits the response signal to the transmission modules 20 wirelessly linked to the Bluetooth wireless transceiving host computer 10. Each transmission module 20 includes a Bluetooth wireless transceiving unit 22, a control unit 24 and an energy storage unit 28. The Bluetooth wireless transceiving unit 22 persistently transmits the upward Bluetooth broadcasting signal to the Bluetooth wireless transceiving host computer 10. Once detecting the upward Bluetooth broadcasting signal, the Bluetooth wireless transceiving host computer 10 generates a response signal corresponding to the upward Bluetooth broadcasting signal and transmits the response signal to the Bluetooth wireless transceiving unit 22. The Bluetooth wireless transceiving unit 22 further transmits the response signal to the control unit 24 electrically connected with the Bluetooth wireless transceiving unit 22. The control unit 24 generates a trigger signal according to the response signal. The sensor module 26 is electrically connected with the control unit 24 and triggered by the trigger signal of the control unit 24 to detect the tire status and generate detection signals. The sensor module 26 transmits the detection signals to the control unit 24. The control unit 24 controls the Bluetooth wireless transceiving unit 22 to encode the detection signals into a transmission signal in a format of a data packet of a broadcasting mode and send out the transmission signal carrying information of the detection signals to the Bluetooth wireless transceiving host computer 10 in a broadcasting way. Then, the Bluetooth wireless transceiving host computer 10 presents the tire status on the display interface (not shown in the drawings). The energy storage unit 28 is electrically connected with and supplies power to the control unit 24, the Bluetooth wireless transceiving unit 22 and the sensor module 26. The sensor module 26 further comprises a tire pressure transducer 262 sensing tire pressure and generating a tire pressure value, a tire temperature transducer 264 sensing tire temperature and generating a tire temperature value and a voltage transducer 266 sensing the voltage of the energy storage unit 28 and generating a voltage value.

The present invention further has a preventive mechanism, which prevents the Bluetooth wireless transceiving unit 22 and the Bluetooth wireless transceiving host computer 10 from transmitting meaningless signals repeatedly, whereby to decrease the power consumption and the machine depreciation. The preventive mechanism is as follows: if the Bluetooth wireless transceiving unit 22 does not receive the response signal from the Bluetooth wireless transceiving host computer 10 after having emitted the upward Bluetooth broadcasting signal over a given number of times, such as 10 times, it indicates that the Bluetooth wireless transceiving host computer 10 is turned off and that the vehicle is stopped; thus, the control unit 24 interrupts the operation of the sensor module 26 until the Bluetooth wireless transceiving unit 22 receives the response signal from the Bluetooth wireless transceiving host computer 10 once again. Owing to the preventive mechanism, the sensor module 26 only works while the vehicle is running. Thereby, the power consumption is reduced, and the service life of the battery is prolonged. In such a case, the Bluetooth wireless transceiving unit 22 may also stop transmitting the tire status but continues emitting the upward Bluetooth broadcasting signal to detect whether the Bluetooth wireless transceiving host computer 10 is tuned on.

The Bluetooth wireless transceiving host computer 10 also has a preventive mechanism: if the Bluetooth wireless transceiving host computer 10 has not received the upward Bluetooth broadcasting signal for over a given period of time, such as 5 minutes, it indicates that the Bluetooth wireless transceiving unit 22 is damaged or turned off. In such a case, the Bluetooth wireless transceiving host computer 10 may inform the user of the problem and suggest the user checking whether the Bluetooth wireless transceiving unit 22 is damaged.

Figure 5:
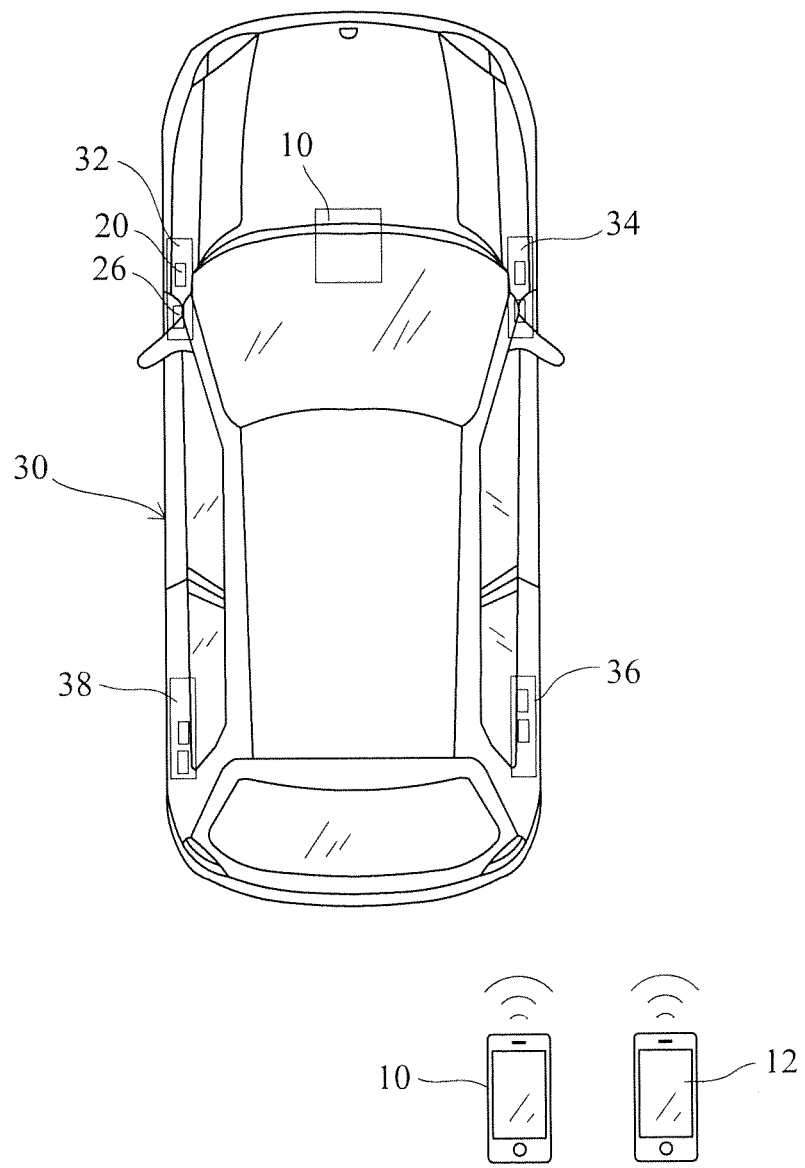
FIG. 5 is a diagram schematically showing an application of a tire status monitoring-transmission system according to one embodiment of the present invention.

The structure of the present invention has been described above, and the application thereof will be described below. Refer to FIG. 4 and FIG. 5. In one embodiment, the transmission module 20 and the sensor module 26 are installed in the valve stem of the tire (not shown in the drawings). In the embodiment, the vehicle 30 is a four-wheel vehicle, and four groups of transmission modules 20 and sensor modules 26 are respectively installed in four tires 32, 34, 36 and 38 to detect the pressures and temperatures of the tires 32-38. Thereinafter, the tire 32 is used to exemplify the tires 32-38. The Bluetooth wireless transceiving unit 22 of the transmission module 20 persistently emits the upward Bluetooth broadcasting signal repeatedly. Once the vehicle 30 is started, the Bluetooth wireless transceiving host computer 10 also starts to scan. While the Bluetooth wireless transceiving host computer 10 detects the upward Bluetooth broadcasting signal, it indicates that the transmission module 20 is operating. Thus, the Bluetooth wireless transceiving host computer 10 transmits a response signal to the Bluetooth wireless transceiving unit 22 of the transmission module 20. Via the identity label of the response signal, the Bluetooth wireless transceiving unit 22 can recognize the identity of the user and avoid transmitting signals to the wrong parties and triggering the sensor module 26 for the wrong parties. After the Bluetooth wireless transceiving unit 22 receives the response signal and confirms the identity of the user according to the identity label, the control unit 24 generates a trigger signal according to the response signal and transmits the trigger signal to the sensor module 26. Thus, the sensor module 26 starts to detect the tire status and generates detection signals. The detection signals include a pressure value generated by a tire pressure transducer 262, a temperature value generated by a tire temperature transducer 264, and a voltage value generated by a voltage transducer 266. The sensor module 26 will undertake measurements a given number of times, such as 4 times, in each measurement cycle. In each measurement cycle, the control unit 24 controls the sensor module to undertake pressure measurements 4 times, temperature measurements 4 times and voltage measurements 4 times to respectively obtain 4 tire pressure values, 4 tire temperature values and 4 voltage values. Then, the control unit 24 respectively averages 4 tire pressure values, 4 tire temperature values and 4 voltage values to obtain the average values thereof as the detection signals. Next, the control unit 24 controls the Bluetooth wireless transceiving unit 22 to encode the detection signals into a transmission signal in a format of a data packet of a broadcasting mode and send out the transmission signal carrying information of the detection signals. Then, the Bluetooth wireless transceiving host computer 10 receives the transmission signal carrying information of the detection signals and presents the tire status on the display interface 12. As the detection signals are sent out in a broadcasting mode, the sender Bluetooth device and the recipient Bluetooth device can communicate with each other without a matching process. Therefore, the present invention needn't spend time in the matching process. Further, the present invention can avoid the signal transmission interruption caused by the blind angle occurring in the rotation of the wheel and thus save much power originally spent in repeated matching in the conventional technology. Therefore, the present invention can prolong the service life of the batteries.

Figure 6:
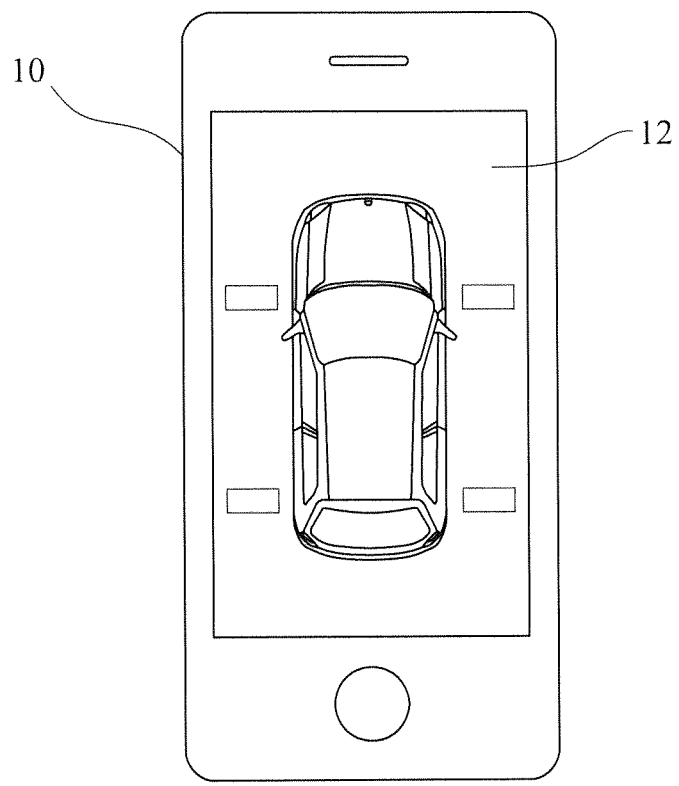
FIG. 6 is a diagram schematically showing a presentation of a Bluetooth wireless transceiving host computer according to one embodiment of the present invention.

Refer to FIG. 6. In one embodiment, the Bluetooth wireless transceiving host computer 10 is a mobile phone. Because each transmission module has its own identification data, the Bluetooth wireless transceiving host computer 10 can recognize the detection signals from each tire. As shown in FIG. 6, the display interface 12 of the mobile phone presents the tire status of each tire.

In conclusion, the present invention uses the Bluetooth technology to realize communication with the external wireless transceiving host computer, whereby to increase the reliability and convenience of signal transmission. Further, the present invention uses the Bluetooth signal to replace the angular velocity sensor in detecting whether the vehicle is started, whereby to improve the accuracy of detecting whether the vehicle is started. Furthermore, the present invention uses a broadcasting method to transmit the Bluetooth signals, whereby to reduce power consumption, save electric energy and lower the cost.

The embodiments described above are only to exemplify the present invention but not to limit the scope of the present invention. Any equivalent modification or variation according to the characteristic or spirit of the present invention is to be also included within the scope of the present invention.

What is claimed is:

1. A tire status monitoring-transmission system comprising
a Bluetooth wireless transceiving host computer having a display interface and sending out a response signal if having detected an upward Bluetooth broadcasting signal;
a plurality of transmission modules wirelessly linking to said Bluetooth wireless transceiving host computer and each including
a Bluetooth wireless transceiving unit persistently emitting said upward Bluetooth broadcasting signal and receiving said response signal after said Bluetooth wireless transceiving host computer receives said upward Bluetooth broadcasting signal and generates said response signal; and
a control unit electrically connected with said Bluetooth wireless transceiving unit and generating a trigger signal according to said response signal; and
a sensor module electrically connected with said control unit, triggered by said trigger signal to detect a tire status, and generating detection signals to said control unit, wherein said control unit further transmits said detection signals to said Bluetooth wireless transceiving host computer through said Bluetooth wireless transceiving unit, and wherein said Bluetooth wireless transceiving host computer presents said tire status and on said display interface.

2. The tire status monitoring-transmission system according to claim 1, wherein said response signal includes an identity label.

3. The tire status monitoring-transmission system according to claim 1 further comprising an energy storage unit electrically connected with said control unit, said Bluetooth wireless transceiving unit, and said sensor module.

4. The tire status monitoring-transmission system according to claim 3, wherein said sensor module includes a tire pressure transducer sensing tire pressure and generating a tire pressure value, a tire temperature transducer sensing tire temperature and generating a tire temperature value, and a voltage transducer sensing voltage of said energy storage unit and generating a voltage value.

5. The tire status monitoring-transmission system according to claim 4, wherein said sensor module undertakes measurements a given number of times in each measurement cycle, and wherein said control unit respectively averages said given number of said tire pressure values, said tire temperature values and said voltage values to generate said detection signals, and wherein said Bluetooth wireless transceiving unit encodes said detection signals into a transmission signal in a format of a data packet of a broadcasting mode and sends out said transmission signal carrying information of said detection signals in a broadcasting way.

6. The tire status monitoring-transmission system according to claim 1, wherein if said Bluetooth wireless transceiving unit does not receive said response signal corresponding to said upward Bluetooth broadcasting signal after said Bluetooth wireless transceiving unit has sent out said upward Bluetooth broadcasting signal a given number of times, it indicates that said Bluetooth wireless transceiving host computer is turned off.

7. The tire status monitoring-transmission system according to claim 1, wherein if said Bluetooth wireless transceiving host computer has not received said upward Bluetooth broadcasting signal for over a given period of time, it indicates that said Bluetooth wireless transceiving unit is damaged or turned off.

8. A transmission device for a tire status monitoring-transmission system, which comprises a Bluetooth wireless transceiving host computer sending out a response signal if having detected an upward Bluetooth broadcasting signal, and which further comprises a Bluetooth wireless transceiving unit persistently emitting said upward Bluetooth broadcasting signal and receiving said response signal after said Bluetooth wireless transceiving host computer receives said upward Bluetooth broadcasting signal and generates said response signal; and a control unit electrically connected with said Bluetooth wireless transceiving unit and sending out a trigger signal according to said response signal.

9. The transmission device for a tire status monitoring-transmission system according to claim 8, wherein said Bluetooth wireless transceiving host computer includes a display interface.

10. The transmission device for a tire status monitoring-transmission system according to claim 9 further comprising a sensor module which is electrically connected with said control unit and triggered by said trigger signal to detect a tire status and generate detection signals to said control unit, wherein said control unit further transmits said detection signals to said Bluetooth wireless transceiving host computer through said Bluetooth wireless transceiving unit, and said Bluetooth wireless transceiving host computer presents said tire status on said display interface.

11. The transmission device for a tire status monitoring-transmission system according to claim 10 further comprising an energy storage unit electrically connected with said control unit, said Bluetooth wireless transceiving unit, and said sensor module.

12. The transmission device for a tire status monitoring-transmission system according to claim 11, wherein said sensor module includes a tire pressure transducer sensing tire pressure and generating a tire pressure value, a tire temperature transducer sensing tire temperature and generating a tire temperature value, and a voltage transducer sensing voltage of said energy storage unit and generating a voltage value.

13. The transmission device for a tire status monitoring-transmission system according to claim 12, wherein said sensor module undertakes measurements a given number of times in each measurement cycle, and wherein said control unit respectively averages said given number of said tire pressure values, said tire temperature values and said voltage values to generate said detection signals, and said Bluetooth wireless transceiving unit encodes said detection signals into a transmission signal in a format of a data packet of a broadcasting mode and sends out said transmission signal carrying information of said detection signals in a broadcasting way.

14. The transmission device for a tire status monitoring-transmission system according to claim 8, wherein if said Bluetooth wireless transceiving unit does not receive said response signal of said upward Bluetooth broadcasting signal after said Bluetooth wireless transceiving unit has sent out said upward Bluetooth broadcasting signal a given number of times, it indicates that said Bluetooth wireless transceiving host computer is turned off.

15. The transmission device for a tire status monitoring-transmission system according to claim 14, wherein if said Bluetooth wireless transceiving host computer has not received said upward Bluetooth broadcasting signal for over a given period of time, it indicates that said Bluetooth wireless transceiving unit is damaged or turned off.

\* \* \* \* \*